June 18, 1940.  P. W. OLSON  2,204,908

BICYCLE LOCK

Filed March 24, 1938

Inventor
Phillip W. Olson

Patented June 18, 1940

2,204,908

UNITED STATES PATENT OFFICE 2,204,908

BICYCLE LOCK

Phillip W. Olson, Grand Rapids, Mich., assignor, by mesne assignments, to Arnold, Schwinn & Company, Inc., Chicago, Ill., a corporation of Illinois Application March 24, 1938, Serial No. 197,792

10 Claims. (Cl. 70—233)

This invention relates in general to bicycle locks, and more particularly to a cylinder lock mounted in a front fork of a bicycle.

A principal object of the invention provides for a simple, secure device built in the fork of the bicycle, which when locked, prevents relative movement between the fork and the head member of the bicycle frame.

A further object of the invention provides for reciprocating members within the fork stem of the bicycle which alternately engage and disengage the fork of the bicycle from the head member of the frame upon rotation of the lock cylinder by the key.

A further object provides for a reciprocating locking means in the fork stem and head of the bicycle whereby the fork may be locked in one or more fixed positions relative to the head member of the bicycle frame.

Referring to the drawing.

Figure 1:
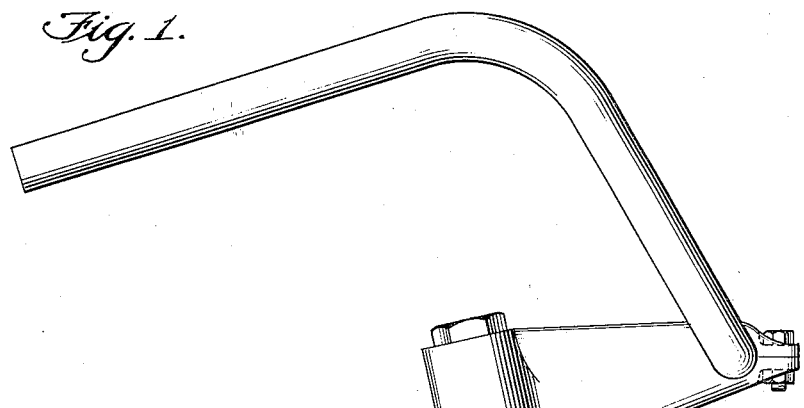
Fig. 1 shows a front fragmentary view of a conventional bicycle with a sectional view through the center of the fork and head.

Referring to Fig. 1, the fork 1 is bored to receive a standard cylinder lock barrel 2 in which cylinder 3 is capable of rotation when the proper key is inserted in the cylinder.

Figure 2:
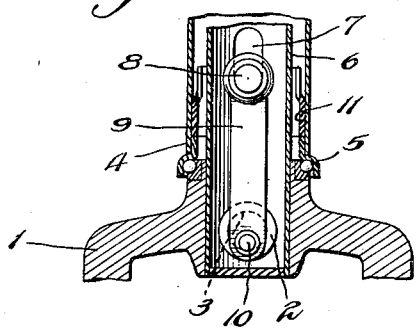
Fig. 2 is a fragmentary cross-sectional view of the front elevation of the fork and head member of the frame taken through line 2—2, Fig. 1.
Figure 2:
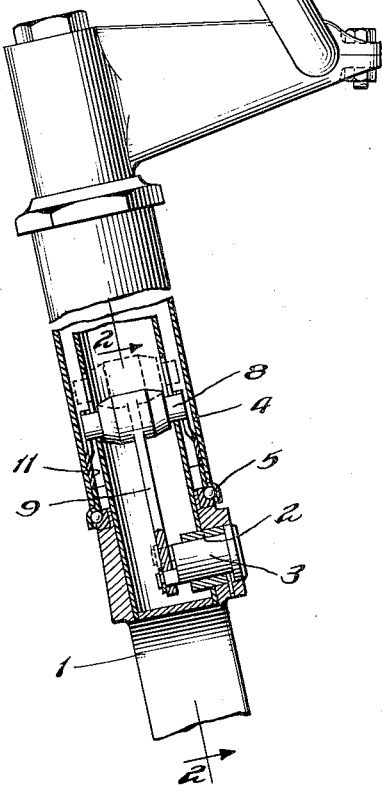

The fork 1 is normally free to rotate in head 4 on thrust bearing 5. The fork stem 6, Fig. 2, contains an elongated slot 7 through both sides of the stem which permits the free movement of wrist pin 8. Connecting link 9, Figs. 1 and 2, is integral with wrist pin 8 and provided with a hole at its lower extremity to engage a crank pin 10 of the lock cylinder. Thus, when the lock cylinder 3 is rotated by the proper key, the wrist pin 8 is reciprocated in the slot 7 by the movement of the link 9.

Figure 3:
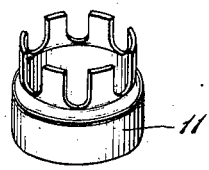
Fig. 3 shows a perspective view of a serrated collar which is secured in the head member of the bicycle frame.

Serrated collar 11, Fig. 3, is welded or otherwise secured inside the head member, as shown in Fig. 2, in a position whereby the wrist pin 8, Fig. 1, will engage opposite slots or crenels in collar or crown 11 when the lock cylinder is turned to its locked position, shown in heavy lines, Fig. 1. Under these conditions, the fork is locked in any one of three positions in fixed relationship with the head member 4.

When the lock cylinder 3 is turned approximately 180 degrees, and re-locked in this position, the wrist pin 8, Fig. 1, is raised and disengaged from collar 11, Fig. 1, shown by dotted lines. In this position, the fork is free to turn in the head member of the bicycle frame.

Having described my invention, I claim:

1. A lock for a bicycle having a tubular head and a wheel fork having a stem normally rotatable within the head, comprising a cylinder key lock rotatable in the fork from the outer side thereof, and locking means comprising a link and a wrist pin carried thereby within the stem connected to the lock and movable thereby longitudinally of the stem, and a member connected to the head having a plurality of slots to engage the wrist pin when moved by the link for locking the fork in any one of a plurality of angular positions as determined by the slots with respect to the head.

2. A lock for a bicycle having a tubular head and a wheel fork with a stem normally rotatable within the head, comprising a rotatable lock cylinder mounted in the forked stem, a slotted locking member secured to and mounted within the tubular head, a link having a wrist pin at one end within the stem and having the other end connected to the lock and being movable thereby longitudinally of the stem, a slot in the stem in which the wrist pin is movable, the link being reciprocated upon rotation of the lock cylinder moving the wrist pin into and out of engagement with the slots of the locking member for locking the wheel fork in one of a plurality of angular positions with respect to the head.

3. A lock for a bicycle having a tubular head and a wheel fork with a hollow stem rotatably mounted within the head, a slotted collar secured in the bore of the tubular head surrounding the stem, a cylinder lock rotatably mounted in the fork and having a crank pin at its inner end within the stem, a reciprocating bolt comprising a connected wrist pin and link within the stem having one end connected to the crank pin, the stem having opposite slots and the wrist pin at its other end projecting through the slots and engageable with the slots of the collar when located at one end of the stem slots and free from the slots of the collar when moved to the other end of the stem slots by the cylinder lock.

4. A lock for a bicycle having a tubular head and a wheel fork with a hollow stem and a crown portion, the lock comprising a rotatable lock cylinder fitted in the crown portion and having an eccentric crank pin at the inner end within the stem, a serrated collar fixed within the tubular head and surrounding the stem, having open slots at the upper end, a locking member extending through opposite slots in the fork stem and projecting to engage in the slots of the collar, and a link connected to the locking member and to the crank pin for moving the locking member to opposite ends of the slots in the stem, depending upon the rotation of the lock cylinder, and thereby to engage and disengage the locking member and the slots of the collar for holding the fork stem in any one of a plurality of different positions with respect to the head.

5. A lock for a bicycle having a tubular head and a forked stem rotatable within the head, the lock including a cylinder rotatable in the fork, a serrated locking member secured to the head and surrounding the stem, a locking bolt comprising a link and a transversely projecting wrist pin near one end of the link, reciprocable within the stem, the other end of the bolt being connected to and movable by the rotation of the lock cylinder, the stem having a slot therein for guiding the wrist pin and the movement of the bolt by the lock cylinder also engaging the wrist pin in any one of the serrations of the locking member for holding the fork in any one of a plurality of angular positions with respect to the head.

6. A lock for a bicycle having a tubular head and wheel fork having a stem journaled in the head, the lock comprising a cylinder lock accessible from without the head, a pin within, and protruding radially from, the stem, an actuating element within the stem and operated by the cylinder lock for shifting the pin longitudinally of the head between vertically spaced positions, a vertical slot in the stem through which the pin extends, and a crown fixed within the head between it and the stem, the crown having a vertical crenel, the pin, when shifted to one of its said positions, passing into the crenel to lock the fork against rotation, and when shifted to its other position, clearing the crenel to permit steering rotation of the stem.

7. A lock for a bicycle having a tubular head and wheel fork having a stem journaled in the head, the lock comprising a cylinder lock accessible from without the head, a pin within, and protruding radially from, the stem, an actuating element within the stem and operated by the cylinder lock for shifting the pin longitudinally of the head between vertically spaced positions, a vertical slot in the stem through which the pin extends, and a crown fixed within the head between it and the stem, the crown having a plurality of arcuately spaced vertical crenels, the pin, when shifted to one of its said positions, selectively occupying one of the crenels as determined by the angular position of the stem to lock the fork against rotation, and when shifted to its other said position being clear of the crenels to permit steering rotation of the stem.

8. A lock for a bicycle having a tubular steering head and a wheel fork having a stem journaled within the head, the lock comprising a cylinder lock carried by the stem, a pin arranged radially of and protruding beyond the stem, means for mounting the pin in the stem for shifting longitudinally of the stem, an actuating member within the stem connecting the cylinder lock and pin for shifting the pin between an upper position and a lower position, and fixed slot means within the head into which the pin is shifted in one of its positions to lock the stem against rotation, and clear of which the pin is shifted in its other position to permit normal steering, the pin being wholly within the stem.

9. A lock for a bicycle having a tubular steering head and a wheel fork having a stem mounted for rotation within the head, the lock comprising a cylinder lock carried by the stem, cooperating locking elements, one of the elements being fixed within the head and without the stem and the other element being slidably mounted in the stem for reciprocation longitudinally thereof between an upper position and a lower position and extending radially without the stem but wholly within the head, and an actuating connection between the cylinder lock and the stem-mounted element for shifting the latter between its upper and lower positions, the stem-mounted element, when in one of its said positions, engaging the other element to lock the stem against rotation and in its other position being free of effective engagement with the other element to permit steering rotation of the stem.

10. A lock, according to claim 9, wherein the cylinder lock is journaled transversely of the stem.

PHILLIP W. OLSON.